Patented Dec. 22, 1942

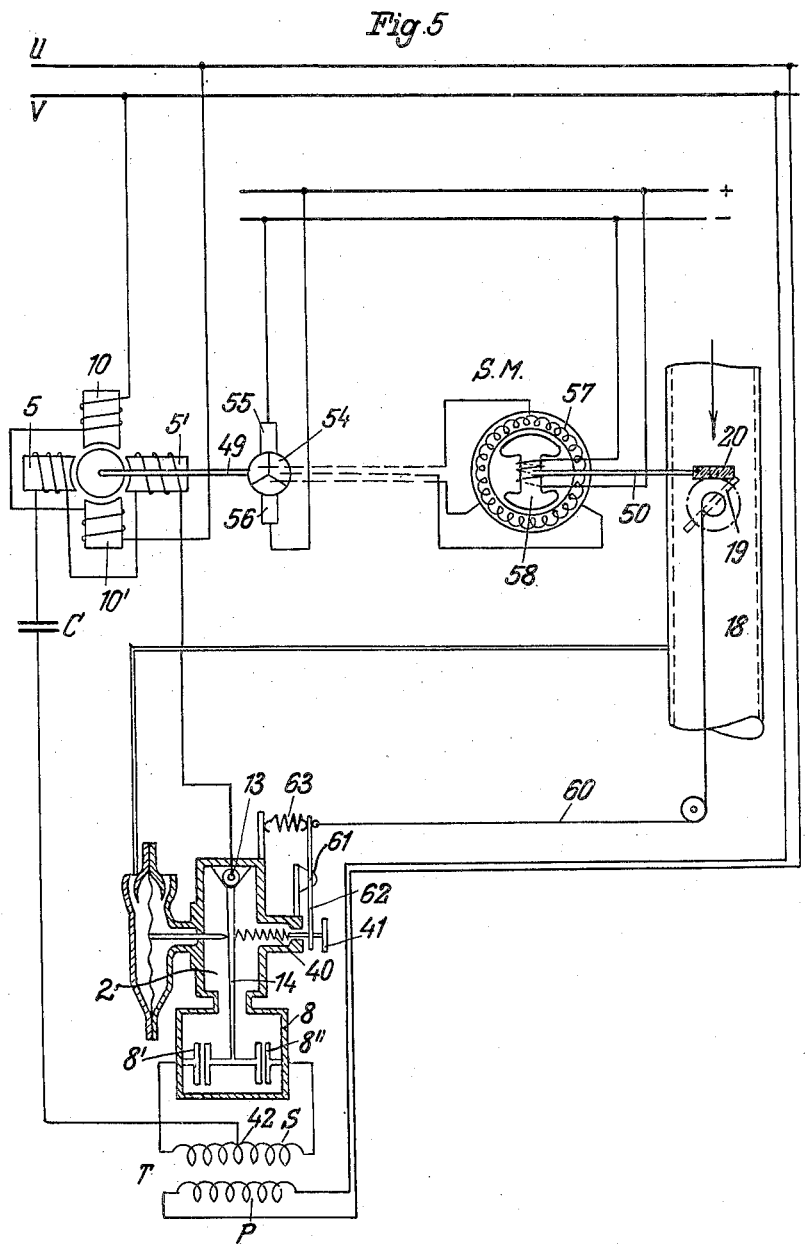

2,305,878

UNITED STATES PATENT OFFICE 2,305,878

ELECTRICAL CONTROLLING DEVICE

Adolf Krüssman, Berlin-Friedenau, and Guido Wünsch, Berlin-Wannsee, Germany; vested in the Alien Property Custodian Application September 5, 1939, Serial No. 293,524
In Germany September 3, 1938

3 Claims. (Cl. 172—239)

The invention relates to improvements in electrical devices for controlling a physical condition, as for instance a temperature, a pressure, a quantity of a flowing medium, or for remote-transmission of a controlling impulse.

The first object of the invention is to render such devices suitable for actuating an electromotor setting a controlled member, as for instance a throttle flap, a valve or the like, in dependence on a controlling impulse.

Another object of the invention is to reduce the influence of inertia in such devices in order to obtain a movement of the controlled member, the phase and amount of such movement corresponding to the phase and amount of the controlling impulse.

A further object is to render such device suitable for responding to even a small impulse of any kind.

It is a further object of the invention to develop the arrangement so that the electro-motor for adjusting the controlled member is brought to a standstill in response to the position of the controlled member. In a further modification of this special feature proportionality may be established between the variations of the impulse and the movement of the controlled member.

Another modification of the above idea would be to bring the motor to a standstill in all cases in which disturbances occur which can no longer be overcome by the regulation because the controlled member has already reached its terminal position.

It is another aim of the invention to modify electrical regulating devices so as to set by electrical means a predetermined value acting upon the regulating device.

Finally it is an object of the invention to use a special torque amplifier which does not react upon a small electro-motor directly controlled by the regulating device.

Figure 1:
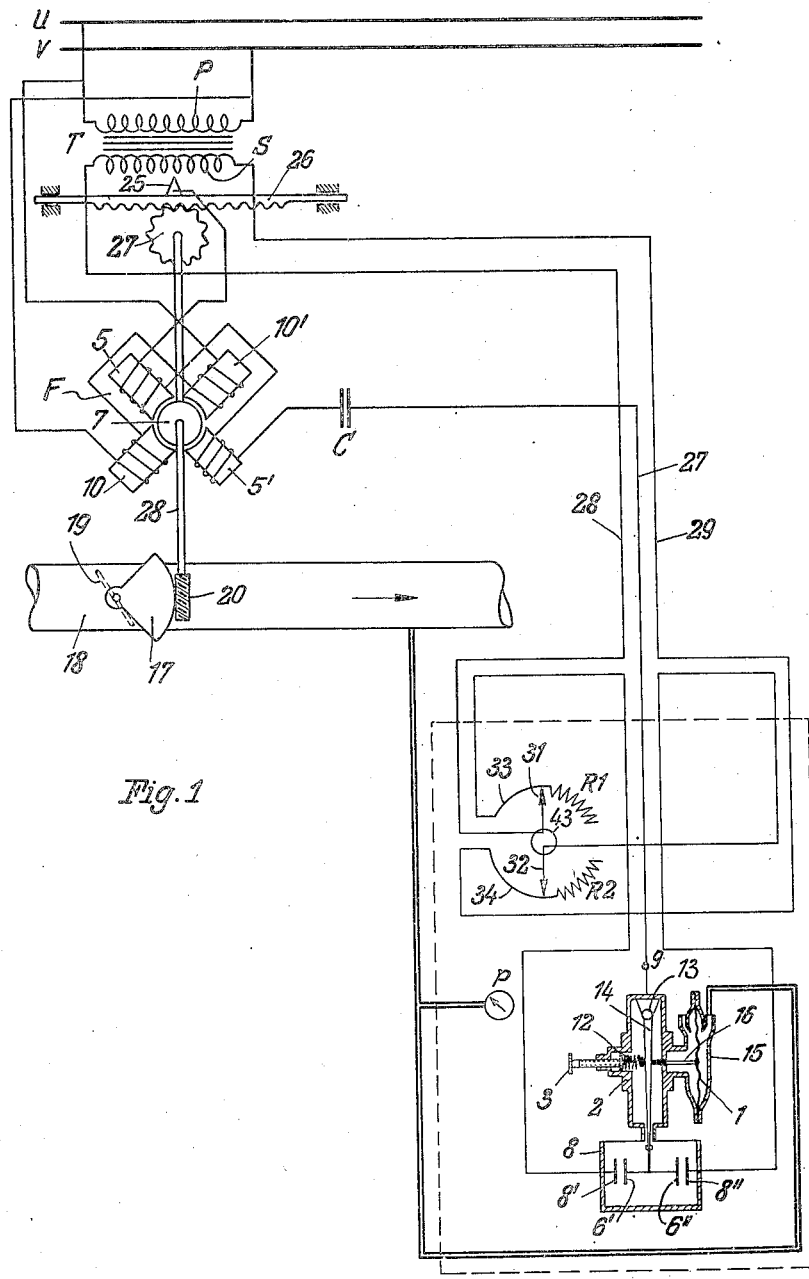
Figure 2:
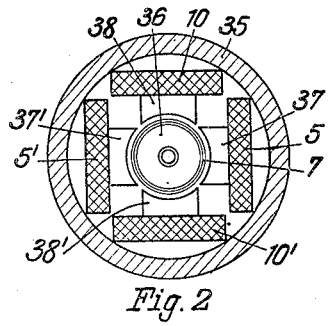
Figure 3:
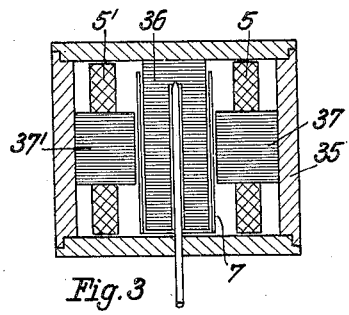
Figure 4:
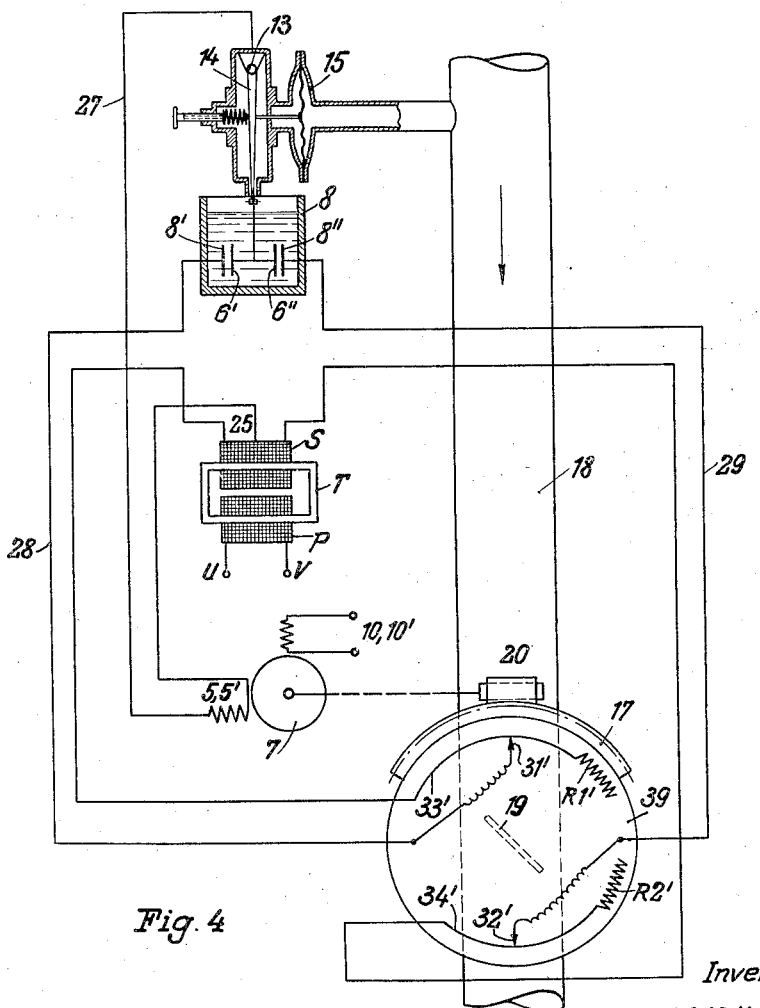

For a better understanding of the invention reference may be had to the drawings, of which Fig. 1 is a diagrammatic view showing a complete arrangement of such a device according to the invention, Figs. 2 and 3 are sectional views of the Ferraris motor, Fig. 4 is a diagrammatic view of a modification of the inventive idea, and Fig. 5 is a diagrammatic view of another modification of same.

Fig. 1 shows diagrammatically an arrangement for maintaining a constant pressure in the conduit 18 by means of the throttle valve 19. $p$ indicates the controlled pressure behind the throttle 19, if the medium flows though the conduit in the direction of the indicated arrow. The measuring instrument indicating this pressure is arranged on a switch board casing indicated by a dotted line, in which casing the relay described in the following is arranged. This relay consists of a pressure responsive means 15 having a diaphragm 1 acted upon by the pressure $p$ and being secured to the relay casing 2. The motion of this diaphragm is transmitted by means of a pin 16 to a lever 14 which is mounted in the casing 2 for movement around the axle 13. A spring 12 counteracts the pressure $p$, the counteracting force of the spring being adjustable by means of a manipulating screw 3 screw threaded into the casing 2. The lower part of the relay casing 2 is constructed as a vessel 8 filled with an electrolyte. The lever 14 carries at its lower end two electrode plates 6′, 6″ being electrically connected to and remote from each other. These electrodes 6′, 6″ are electrically connected to the terminal 9 by means of an insulated conductor in the interior of the lever 14. Each of the electrodes 6′, 6″ faces one of two outer electrodes 8′, 8″ which are rigidly connected to the wall of the vessel 8. The four electrodes are arranged in such a manner that the center electrodes 6′, 6″ may be moved relative to the outer electrodes 8′, 8″ in two opposite directions. The outer electrodes 8′, 8″ are connected by wires 28, 29 parallel to the tapped secondary winding S of the transformer T, the primary winding P of which is fed by the A. C. power source U, V. For the purpose of adjusting the throttle valve 19, a Ferraris motor F of the drum type is provided. The Ferraris motor conventionally has two magnetic exciting fields, the series connected windings 5, 5′ and 10, 10′ being disposed at right angles to each other. The series connected windings 5, 5′ of the Ferraris motor are connected by the wire 27 to the terminal 9 of the center electrodes 6′, 6″ and to the tap 25 of the secondary winding S. In this arrangement the device 8, 6′, 6″ acts as a potentiometer. The other series connected winding 10, 10′ of the Ferraris motor are directly connected to the A. C. network U, V. The rotor 7 of the Ferraris motor F rotates a worm 20 which engages a worm wheel segment 17 connected to the throttle 19, a rotation of the worm 20 causing a movement of the segment 17 and consequently a movement of the throttle valve 19.

The tap 25 of the secondary winding S is mounted on a toothed rod 26, slidably mounted and engaging a gear wheel 27 mounted on the shaft 28 of the Ferraris motor. Thereby the tap 25 slides on the secondary winding of the transformer T when the Ferraris motor is running. The liquid potentiometer together with the tapped secondary winding S of the transformer T forms an electrical resistance bridge in whose diagonal one exciting field system of the Ferraris motor is connected.

Additional balancing resistances $R_1$, $R_2$ may be inserted in the wires 28, 29, i. e., in the two branches of the resistance bridge by means of the rotatable knob 43 on which two movable contacts 31, 32 are fixed. Before these contacts slide on the corresponding resistances $R_1$, $R_2$, they move on slides 33, 34 in such manner that only one contact slides on the corresponding resistance, while the other contact moves on its slide, thereby bridging the corresponding resistance. In this way the additional balancing resistances $R_1$, $R_2$ are simultaneously adjustable thereby reducing the consumption of energy by the additional resistances to an unavoidable degree.

Assuming that the tap 25 has its middle position on the secondary winding of the transformer T, so that the voltages on both sides of the tap 25 are equal and that no resistances $R_1$, $R_2$ are inserted into the resistance bridge, the spring 12 is so adjusted that the center electrodes 6', 6'' have at a certain pressure approximately the same distance with respect to the outer electrodes 8', 8'', i. e., zero potential. In this case the voltage between each of the electrodes 6', 6'' and each of the outer electrodes 8', 8'' are equal so that no current flows through the exciting windings 5, 5' of the Ferraris motor, and the motor comes to a standstill. As soon as the pressure changes, the lever 14 is displaced to the left or right and therefore a voltage is produced between the center electrodes 6', 6'' and the tap 25 of the transformer T, the phase and amount of which correspond to the amount and direction of the displacement of the lever 14 from its initial position. In consequence thereof a current flows through the windings 5, 5', the intensity and phase of this current determining the rate and direction of the movement of the Ferraris motor.

As soon as the Ferraris motor starts operating, it adjusts the throttle 19 for compensating the pressure variation. Simultaneously the Ferraris motor shifts the movable tap 25 along the secondary of the transformer T. The electric connection of the Ferraris motor is chosen so as to move the tap 25 to the right if the electrodes 6', 6'' are likewise moved to the right due to a decrease of the pressure impulse. The movement of the Ferraris motor continues until the electric potential of the tap 25 has become equal to that of the electrodes 6', 6'', i. e., until the Ferraris motor comes to a standstill. In any case the Ferraris motor gradually varies the bridge resistances formed by the secondary winding of the transformer T so that a different running period of the Ferraris motor and consequently a different controlled movement of the throttle flap 19 corresponds to a different deflection of the center electrodes, i. e. that proportionality exists between the change of the impulse and the controlled movement. This has the advantage that selective choosing of the regulating device is avoided.

Assuming that the knob 43 is turned clockwise from its middle position so that resistance $R_1$ is switched on, the bridge becomes unbalanced and the Ferraris motor starts running, moving therefore the tap 25 along the secondary winding S to the right until the bridge is again balanced. Simultaneously the throttle 19 is opened still further. In other words, a new pressure value will now be maintained. The opposite takes place if the knob 43 is adjusted counterclockwise, whereby the resistance $R_2$ is switched on while the resistance $R_1$ is entirely switched off.

A capacity C is connected in the line with the windings 5, 5', said capacity being dimensioned so as to be tuned to the frequency of the A. C. power system. In the circuit comprising the windings 5, 5' and the capacity C the $\cos \phi$ is 1 or approximately 1. Consequently the liquid potentiometer 8 is loaded either to no reactive power or only a very small power, i. e., a small deflection of the lever 14 produces a relatively great change in the exciting current flowing in the windings 5, 5', or in other words, a relatively great torque of the Ferraris motor. The capacity C at the same time furnishes the requisite phase displacement between the current in the windings 10, 10' and the current in the windings 5, 5'. This arrangement has the further advantage that a lower voltage of the A. C. power source may be used which eliminates the danger of electric decomposition of the electrolyte and of changes in the electrodes.

Ferraris motors are eminently suitable for regulating purposes. They are of very small mass and therefore of very small inertia. Furthermore, Ferraris motors possess a great sensitivity in the zero range of the controlling current in the windings 5, 5' so as to respond to very weak controlling currents. Their speed and torque are approximately proportional to the controlling current. In addition they are well adapted for self-damping. Thus the Ferraris motor unites in itself many properties rendering its use as setting motor in regulating devices advantageous. According to Fig. 1 one magnetic field is constantly excited while the other magnetic field is continuously variable. It is of course possible to vary both magnetic fields if circumstances should require this. At all events, the speed and the torque of the Ferraris motor may be very easily and accurately controlled by changing one or both fields, i. e. the current exciting said fields, respectively.

It is advantageous to use a Ferraris motor the movable induced part of which is developed as a conducting drum. A Ferraris motor of this type is much superior to the Ferraris motor having an induced movable disc from the point of view of the smallness of the moment of inertia, as for the purpose of producing the same torque in a Ferraris motor of the disc type, the outer diameter of the movable induced part—on which the amount of the inertia largely depends—must be chosen considerably greater than the outer diameter of a drum, whose cylinder shell is the part intersecting the magnetic flux and hence may be of much smaller diameter. By using a Ferraris motor with a drum rotor, the ratio $$\frac{\text{Produced torque}}{\text{Moment of inertia of the rotor}}$$

may be greater than in using a Ferraris motor having an induced disc. The motor of the drum type has besides a greater inherent electrical self-damping so that the ratio of damping and inertia moment of this motor is considerably more favorable than that of the motor of the disc type, whereby a more rapid braking of the moved part of the motor is ensured. This is of great importance more especially in the case of rapidly changing regulating conditions for attaining a regulation proceeding as much as possible in the same phases as the impulse.

Figs. 2 and 3 show the Ferraris motor of the drum type in detail. It consists of a cylindrical casing 35 in which a core 36 is concentrically arranged, said core being of laminated iron. Around the core 36 four pole shoes 37, 37', 38, 38' are disposed at 90° intervals having windings 5, 5', 10, 10'. The windings 5 and 5' generate a field which is vertical to the field generated by the windings 10, 10'. Between the pole shoes 37, 37', 38, 38' and the iron core 36 a thin aluminium cylinder 7 acting as rotor is rotatably mounted.

The above described mode of adjusting the impulse to which the regulator is responsive has the following advantage:

Commonly the setting of the impulse value is effected by means of an adjustable force counteracting the impulse at the impulse system—mostly the force of a spring adjustable by hand—in such manner that every adjusted impulse value is balanced by another force counteracting the impulse. As a rule, the adjusting spring cannot be manipulated while simultaneously watching the instrument indicating the impulse value as the relay having the adjusting spring is arranged in the switch board casing, the switchboard of which carries the indicating instrument. This renders the adjustment of the spring inconvenient. If however in accordance with the invention the regulating value is made adjustable by adjusting the bridge resistances, the setting procedure is considerably simplified, as the elements for adjustment of the bridge resistances may be arranged on the switchboard, and the operator may consequently set the bridge resistances and hence the requisite value while simultaneously watching the indicating instrument. This mode of setting may at the same time serve for minute adjustment of the requisite regulating value.

The idea of bringing the motor to a standstill in dependence on the position of the controlled member may also be used in cases where no means are provided in the regulating device for establishing proportionality between the running period of the motor adjusting the controlled member and the amount of the movement of the controlled member as is often the case. This may be advantageous if disturbances occur which can no longer be overcome by regulation because the regulating member (throttle, valve) has already reached one of its terminal positions. In this event it is awkward that the Ferraris motor tends to continue running thereby pressing the regulating member against its stops.

Fig. 4 shows an arrangement in which this drawback is avoided. This is fundamentally the same arrangement of the regulating device as shown in Fig. 1 except that the tap 25 of the secondary winding of the transformer T is fixedly arranged in the center of the secondary winding S. Additional balancing resistances $R_1$, $R_2$ are connected by means of a circular arc-shaped slide 33', 34' each to a terminal of the secondary winding S of the transformer T, while the contacts 31', 32' sliding on the slides 33', 34' and on the resistances $R_1$, $R_2$ are connected to an electrode 8', 8''. The slides and resistances are assumed to be fixedly arranged, while the contacts 31', 32' are rigidly connected to the setting member 39 of the throttle valve 19, the setting member 39 having a toothed gear segment 17 engaging the worm 20 driven by the Ferraris motor. The throttle valve is represented in its center position between the absolute opening and the absolute closing of the pipe conduit 18. In this arrangement—if the setting member 39 is turned in the one or other direction—one contact slides on the respective balancing resistance thereby gradually switching on the respective resistance shortly before the throttle end positions have been reached, while the other contact slides on its slide thereby bridging the respective resistance. If the disturbance is so considerable that it cannot be overcome because the throttle valve is already fully opened or closed, the center electrode 6, 6' of the electrolyte potentiometer will remain fully displaced from its center position, so that the Ferraris motor continues running in consequence thereof. As soon as the regulating member has reached one of its end positions, resistances $R_1$ or $R_2$, respectively, are switched on. If each of the resistances is at least equal to the total resistance existing between the electrodes 6', 8' and 6'', 8'' of the potentiometer 8, the bridge again becomes balanced. The Ferraris motor is stopped and does not again commence running until a controlling impulse becomes operative in the other direction. Hereby the center electrode is shifted from its extreme position to its center position. This in turn causes the bridge to become unbalanced, the Ferraris motor starts running shifting the throttle valve 19 from its end position, and the throttle valve switching off the resistances $R_1$, $R_2$, respectively. The unbalanced condition still existent is only removed when the pressure has restored the value which is to be maintained constant.

Errors due to temperature variations of the electrolyte potentiometer are avoided by using the arrangement according to Fig. 4, as so much resistance is switched on until the balance of the bridge has been restored.

If the torque of the Ferraris motor does not suffice for adjustment of the control member, a torque amplifier may be used in combination with the above explained regulating device. Fig. 5 shows an embodiment of this arrangement.

55 is a rotating converter consisting of a rotary commutator 54 having three conducting segments insulated against each other and coupled with the drum shaft 49 of the Ferraris motor whose mode of controlling has already been described. The commutator is fed from a D. C. network + − by two fixedly mounted brushes 55', 56' sliding on the commutator. The follow-up motor consists of a synchronous motor SM having a three-phase stator winding 57 connected to the three segments of the commutator and a rotating exciting field 58 by the D. C. network. When the commutator rotates, a three-phase A. C. of a frequency corresponding to the speed of the commutator is fed by the three commutator segments, said A. C. exciting the three-phase field winding 57 of the synchronous motor SM, thereby producing in the stator of the follow-up motor a field rotating synchronously with the speed of the commutator and simultaneously driving the exciting field system 58. Said system is coupled by means of the shaft 50 to a worm gear 20 adjusting the regulating device, in this case the throttle valve 19 in the conduit 18.

Upon the movement of the throttle valve the tension of the spring 40 serving to adjust the requisite control value changes, thereby displacing the lever 14 in dependence on the position of the throttle valve. For this purpose the set screw 41 for manually varying the force of the spring 40 is adjustably mounted on one end of the lever 62 rotatably supported on 61 at the impulse transmitter casing 2, the other end of the lever being on the one hand acted upon by a readjusting spring 63 and on the other hand connected to one end of a cable 60 of which the other end is connected to the throttle valve 19. Thus in response to a pressure variation acting upon the diaphragm 1, the throttle valve 19—which by means of the above described arrangement tends to compensate the pressure variation by more or less closing the pipe conduit—moves the lever 62 by means of the cable 60 so as to vary the tension of the adjusting spring 40 for the purpose of displacing the movable relay member in the direction of its initial position.

Follow-up systems of the described type are eminently suitable for amplifying the torques of motors of small power, as these follow-up systems do not react upon the element driving the transmitter and only small forces are required for adjusting the transmitting commutator. The load of the Ferraris motor consists merely in the very small friction of the brushes and bearings of the commutator 54, while the actual power of the synchronous motor is fed from the D. C. network + −. Thus the Ferraris motor may be of very small size and it is capable of following with practically no delay all variations of the controlling impulse supplied by the relay 8. In this arrangement therefore the Ferraris motor serves merely as controlling motor for the torque amplifier coupled therewith. A further advantage of such an arrangement, in which no reaction exists upon the control motor driving the transmitter of the follow-up system, is that the speed of the controlling motor and hence the speed of the working motor are independent of the power delivered by the working motor.

What is claimed is:

1. An electrically operated control device comprising, in combination, a controlling impulse system, said impulse system being counteracted by an adjustable mechanical force for obtaining a regulation by a small number of steps of the regulating value; an electric A. C. resistance bridge having variable resistances; an A. C. power source, said resistance bridge being fed by said A. C. power source, and the controlling impulse system acting upon said variable bridge resistance for disturbing the balance of said resistance bridge in dependence on the controlling impulse; additional balancing resistances which are manually adjustable for obtaining an additional regulation by a plurality of steps of the regulating value; and a Ferraris motor of the drum type having two exciting field systems, one of the field systems being directly connected to the diagonal branch of said resistance bridge, and said Ferraris motor actuating a member in response to the variations of said control impulse.

2. An electrically operated control device according to claim 1, in which an additional balancing resistance manually adjustable is provided on each side of a branch of the bridge, each additional balancing resistance being out of operation as long as the other balancing resistance is in operation.

3. An electrically operated control device comprising, in combination, a controlling impulse system; an electric A. C. resistance bridge having a plurality of variable resistances; an A. C. power source; said resistance bridge being fed by said A. C. power source; said controlling impulse system acting upon a part of said variable resistances for disturbing the balance of said resistance bridge in dependence on said controlling impulse; a Ferraris motor of the drum type having two exciting field systems, one of said field systems being directly connected to said A. C. power source and the other being connected to the diagonal branch of said resistance bridge; said Ferraris motor actuating a member in response to the variations of the control impulse and said Ferraris motor acting upon the other part of the variable resistances of the bridge for restoring the balance of the bridge, said bridge resistances which are adjustable by the controlling impulse system representing a potentiometer forming one branch of the bridge and the other branch being formed by the secondary winding of a transformer of which the primary winding is connected to the A. C. power source; and a tap movable over the secondary winding and operatively connected to the rotor of the Ferraris motor to be moved by said rotor in order to restore the balance of the bridge.

ADOLF KRÜSSMANN.
GUIDO WÜNSCH.